United States Patent

Berg

[11] Patent Number: 5,372,063
[45] Date of Patent: Dec. 13, 1994

[54] PRESS FOR FORCING LIQUID FROM CANNED SOLID FOODS

[75] Inventor: Roger M. Berg, Aloha, Oreg.

[73] Assignee: Berg/USA Enterprises, Inc., Aloha, Oreg.

[21] Appl. No.: 25,124

[22] Filed: Mar. 2, 1993

[51] Int. Cl.[5] .............................................. B30B 9/02
[52] U.S. Cl. ..................... 100/110; D7/665; 99/506; 100/213; 100/295; 294/65.5
[58] Field of Search ............... 100/110, 104, 116, 213, 100/248, 295, 910; 99/495, 506; 294/65.5; D7/369, 665, 668, 669

[56] References Cited

U.S. PATENT DOCUMENTS

| | | | |
|---|---|---|---|
| 614,374 | 11/1898 | Easley | 99/506 |
| 1,027,251 | 5/1912 | Hill | 100/910 X |
| 1,596,148 | 8/1926 | Bristol | 99/506 |
| 2,024,917 | 12/1935 | Franze | 99/506 |
| 2,848,006 | 8/1958 | Simpson | 294/65.5 X |
| 2,947,563 | 8/1960 | Stitt | 294/65.5 |
| 3,995,544 | 12/1976 | Farley | 100/116 |
| 4,185,261 | 1/1980 | Nagata | 294/65.5 X |
| 4,860,647 | 8/1989 | Kerslake | 100/110 X |

FOREIGN PATENT DOCUMENTS 1913524  11/1971  Germany .................. 294/65.5

Primary Examiner—Stephen F. Gerrity
Attorney, Agent, or Firm—Eugene M. Eckelman

[57] ABSTRACT

A body member of a press has a peripheral imperforate side wall and an imperforate end wall, the end opposite from the imperforate wall being open. The press has a lid-engaging portion capable of abutting a severed but remaining lid of a can and utilizing the lid as a pressing plate to press liquid from food in the can upon relative forced telescoping movement of the body member and the can. The lid engaging member supports a magnet capable of magnetically attracting the lid and pulling the lid out of the can upon completion of the pressing operation. The magnet can also serve to attach the press to a metal surface. The can engaging area of the press is shaped to fit the contour of the lid of a can.

6 Claims, 4 Drawing Sheets

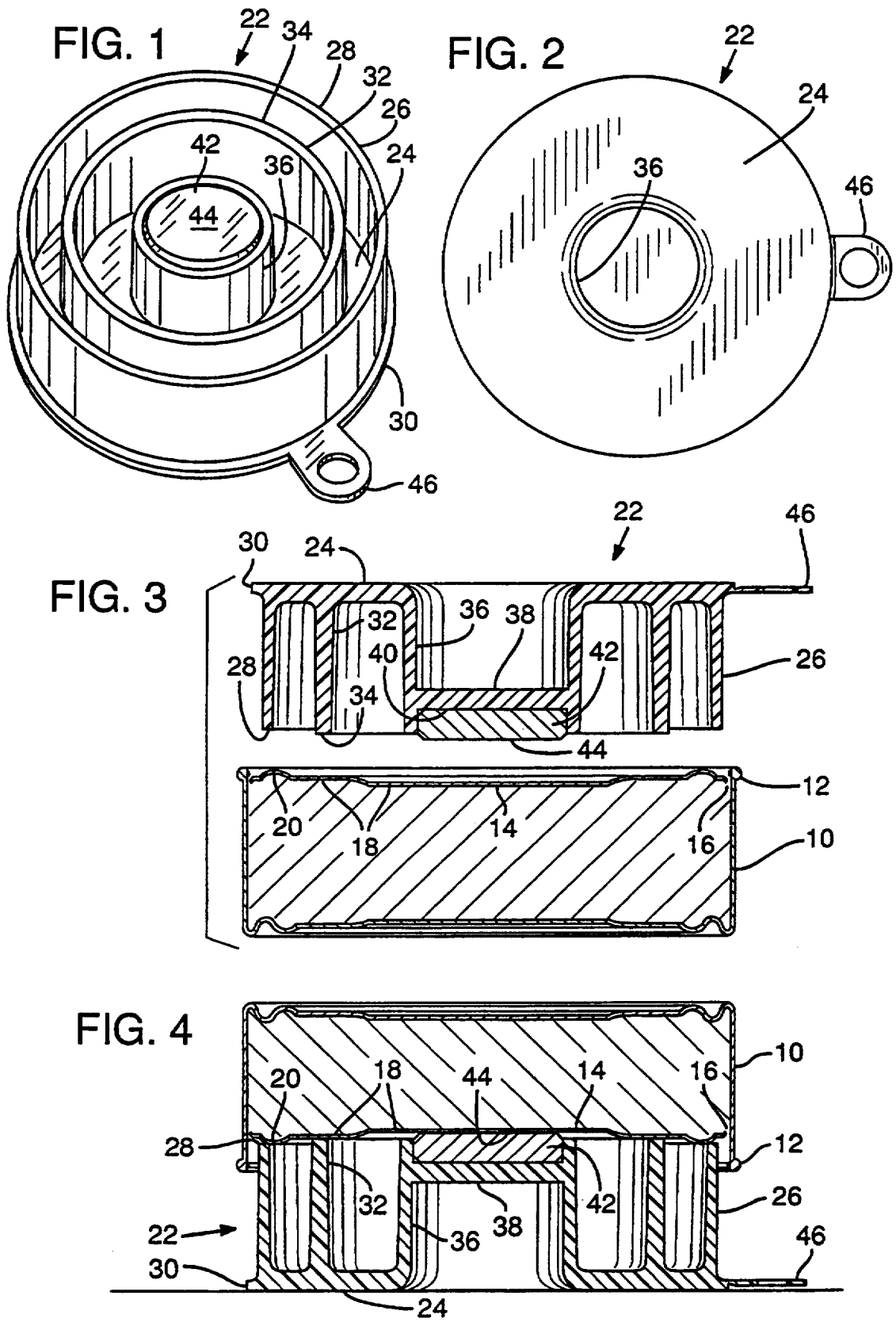

PRESS FOR FORCING LIQUID FROM CANNED SOLID FOODS

BACKGROUND OF THE INVENTION

This invention relates to a press for forcing liquid from canned solid foods, and although it can be used for any number of foods, its most preferred use is with the 6 oz and 12 oz cans of tuna.

Tuna is usually advertised as being water or oil packed. This would seem to indicate that the liquid is only around the tuna. If this were the case, the user could simply hold the severed lid against the contents and pour the liquid off. The fact is most of the liquid is retained within the tuna itself. Most people squeeze out the liquid by first opening the can and then pushing the severed lid down in the can with their fingers or thumbs while holding the can upside down. This procedure exerts forces on the lid primarily at the two finger engaging points. This causes the thin lid to bend which obviously applies an uneven pressure against the tuna. A good share of the juice thus still remains within the tuna. This is particularly so with persons with weak hands. The two point uneven pressure can also cause the edges of the lid to bend up and be a source of injury to the user. Also, pressing of the liquid from the can in the above manner not only exposes the fingers to the odorous contents but unless precise even pressure is applied the lid frequently sticks in the can. Furthermore getting the lid out of the can after pressing is time consuming and can result in injury. The problems encountered in forcing the liquid from canned solid foods have been recognized and products have been designed in an effort to make them more simplified. As an example, U.S. Pat. No. 3,995,544 is directed to a utensil that comprises a cup-shaped member that can fit within an open can and that employs a perforated pressing wall portion that engages the contents of the can and squeezes the juice therefrom through the perforations when the member is forced into the can.

SUMMARY OF THE INVENTION

It is an object of the invention to provide an improved press for forcing liquid from tuna cans.

Another object of the invention is to provide a press of the type described that accomplishes the pressing operation with the severed lid remaining in the can, the lid forming a part of the pressing structure.

Another object is to provide a press of the type described that utilizes magnet means as a part of the press to retrieve the severed lid after the pressing operation is completed.

Other objects are to provide a press of the type described that eliminates contact of the contents of the can with the fingers or the hands to prevent the odorous material from getting on the person's hands and that reduces to a minimum the possibility of injury to the user.

In carrying out these objects, the press includes a body member having an imperforate wall at one end and an integral imperforate defining side wall. The end of the body member from the imperforate end wall is open. One of these ends includes lid-engaging means capable of abutting a severed lid in the can and utilizing the lid as a pressing plate in a manner that maintains the 'flatness' of the lid, i.e. the lid not bending, to extract liquid from solid food in the can upon relative forced telescoping movement of the body member and the can.

The lid engaging means supports a magnet which pulls the lid out of the can after the pressing operation is completed. The magnet also provides a support for the press on a metal surface, such as on a refrigerator, when the press is not in use. The embodiments of the invention utilize a cylindrical leg or flange leading from the imperforate end wall and disposed inwardly of the side wall in spaced parallel relation therewith. This leg terminates in an end edge that forms a part of the lid engaging means in a pressing operation. The magnet is supported to also form a portion of the lid engaging means in a pressing operation. Some embodiments of the invention have a diameter less than the internal diameter of a tuna can whereby the body member telescopes inside of the can in a pressing operation. In another embodiment, the diameter of the body member is greater than the diameter of the tuna can and the tuna can moves interiorly of the body member in the pressing operation, this embodiment being capable of forming a reservoir for catching liquids from the can. The body member can take various other shapes and nevertheless accomplish the same pressing features.

The invention will be better understood and additional objects and advantages will become apparent from the following description taken in connection with the accompanying drawings.

BRIEF DESCRIPTION OF THE DRAWINGS

FIG. 1 is an isometric view of a first form of the invention with the bottom end facing upwardly.

FIG. 2 is a top plan view of the FIG. 1 embodiment.

FIG. 3 is a central sectional view of the press of FIG. 1 showing the press in an initial step before pressing.

FIG. 4 is a sectional view of the press of FIG. 1 in an advancing step of pressing.

DETAILED DESCRIPTION OF PREFERRED EMBODIMENTS

Figure 5:
FIGS. 5 and 6 are perspective views showing steps of pressing liquid from a tuna can according to the invention.

FIGS. 3 and 4 show in general the cross sectional shape of a 6 oz tuna can 10. Such a can has a rolled top edge 12 and a lid 14 arranged to be severed by a can opener in a cut 16 made just inside the edge. The lid has inner, somewhat flat surface areas 18 but an outer area 20 adjacent the edge is ribbed for stiffness. According to the present invention, the lid is not initially removed after cutting but as will be apparent hereinafter, it is used as a pressing plate or platen during pressing operations.

Referring first to FIGS. 1-6, the press 22 of this embodiment has an imperforate end or top wall 24 and an outer defining circular side wall 26 integral with the end wall and having an end edge 28. The end wall 24 has a diameter slightly larger than the defining side wall, thus forming a narrow top edge flange 30. This flange provides a gripping edge if the press sticks in the can. The outer diameter of the defining side wall 26 is less than the internal diameter of a tuna can to allow this wall to fit loosely in guided relation within the tuna can.

A circular pressing leg or flange 32 extends integrally from the top wall 24. This leg is concentric with the outer defining wall 26 and of less diameter. The end edge 34 of the leg 32 extends a short distance, such as about 0.040 inch, beyond the end edge 28 of the defining side wall 26.

A cylindrical hollow support 36 extends inwardly from the top wall 24 in concentric relation with wall 26 and includes a cross wall 38 spaced inwardly from the bottom end of the press. This inward spacing forms a socket 40 for a permanent magnet 42. The face surface 44 of this magnet projects a small amount, such as about 0.040 inch, below the edge 34. Flange 30 has a lateral extension comprising a hanging tab 46.

Figure 6:
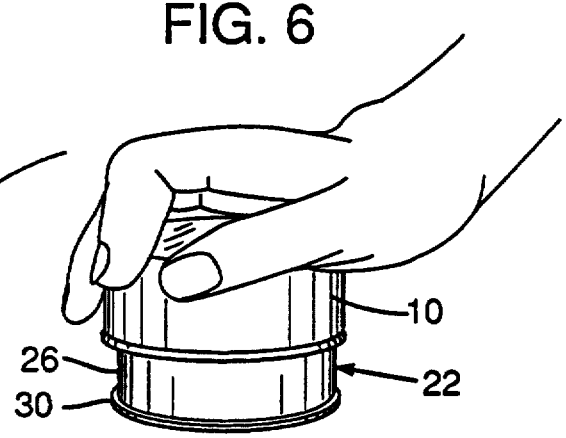

In the operation of removing liquid from solid food in cans using the embodiment of FIGS. 1-6, the lid of the can is first severed around its edge, namely, as shown in FIG. 3. The can is upright when the lid is severed and the lid is allowed to remain in the can. It is then usually desirable to grasp the can as shown in FIG. 5 and hold the lid down with enough pressure to support the lid in place while tipping the can, thus draining off excess liquid from the can. In this manner excess liquid is drained off without the user touching any of the contents of the can. Thereupon, the press is placed on the can in its upright position as shown in FIG. 3. Then the assembly is inverted as shown in FIG. 4. A pressing function is obtained with the hand as shown in FIG. 6 or by any other means such as with the foot. The liquid squeezes out around the edge of the lid and down side wall 26. This operation is done with the assembly in a sink or in a pan to catch the fluid. When pressing is completed, it is desirable to wiggle the can to release the lid from the food so that the lid will stay with the press for easy disposal. The press is rinsed off in the sink and can be put in a dishwasher.

In all pressing operations, the lid 14 is left in the can after opening the can and serves as a pressing plate or platen for the press 22. In the engagement of the press 22 relative to the can, the outer defining wall 26 serves as a guide along the inner wall of the can for telescoping movement of the press into the can with the lid held in a flat plane at right angles to the axis of the can. The edge 28 and the edge 34 of the pressing leg 32 as well as the magnet surface 44 form a surface substantially parallel with the top wall 24 that serve as the pressing areas on the lid, the surface relation of edge 34 and the magnet conforming to the surface contour of areas 18 of the can for uniform pressure without deforming the lid.

Figure 7:
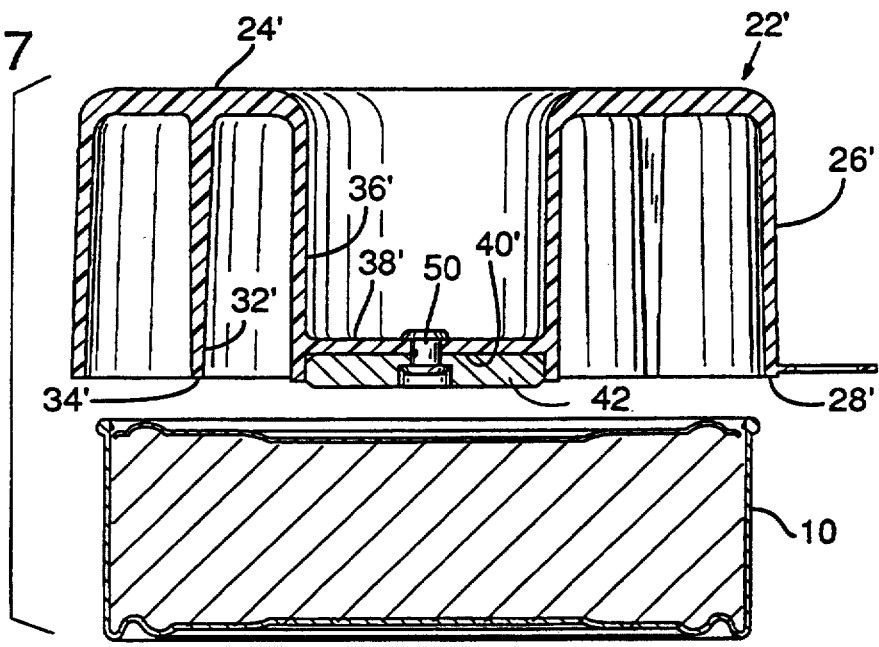
FIG. 7 is a sectional view of another embodiment of the invention, this view showing the press in an initial step before pressing.
Figure 8:
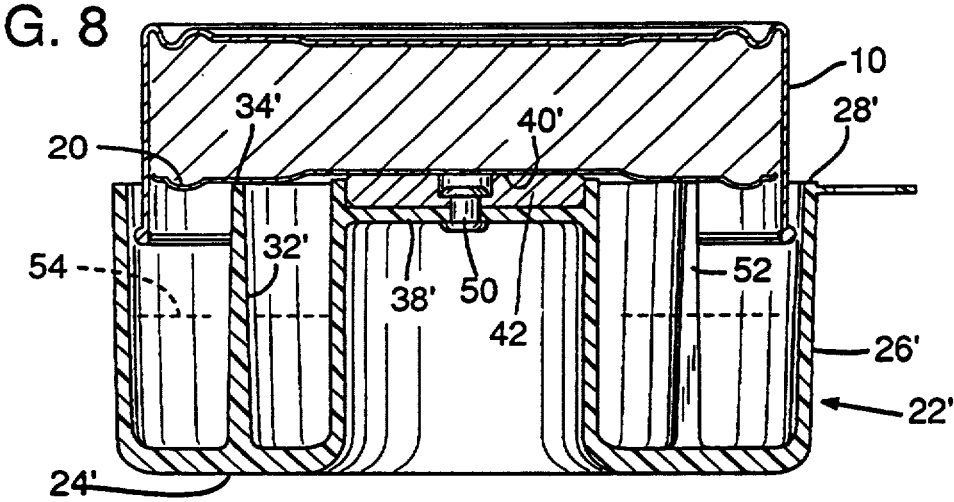
FIG. 8 is a sectional view of the press of FIG. 7 in an advancing step of pressing.

FIGS. 7 and 8 show an embodiment of the invention comprising a press 22' having a structure somewhat similar to the FIG. 1 embodiment in that it comprises an imperforate top or end wall 24', a defining side wall 26', and an end edge 28' of the defining side wall. This embodiment also has an intermediate circular pressing leg 32' with an end edge 34'. Furthermore, this embodiment includes a cylindrical hollow support 36' with a cross wall 38' forming a socket 40' for a permanent magnet 42'. If desired, the magnet can be held in place by fastening means 50. The embodiment of FIGS. 7 and 8 differs from FIG. 1 in that the outer defining wall 26' has a greater diameter than the tuna can, and in the pressing operation, this outer wall will pass along the exterior of the can and have guided telescoping movement therewith. The pressing steps and function are the same except that in the inverted pressing position of the press 22', the liquid pressed from the can will drain into the inverted press which acts as a reservoir. Leg 32' has a narrow opening 52, such as an upright slot, to allow the liquid to flow to the opposite side of the pressing leg 32' to increase the reservoir volume. This volume is great enough to hold 2 ozs of liquid which will have a depth in the press approximately that designated by the dotted line 54 in FIG. 8 and such depth will not be contacted by the can in a full press condition.

Figure 9:
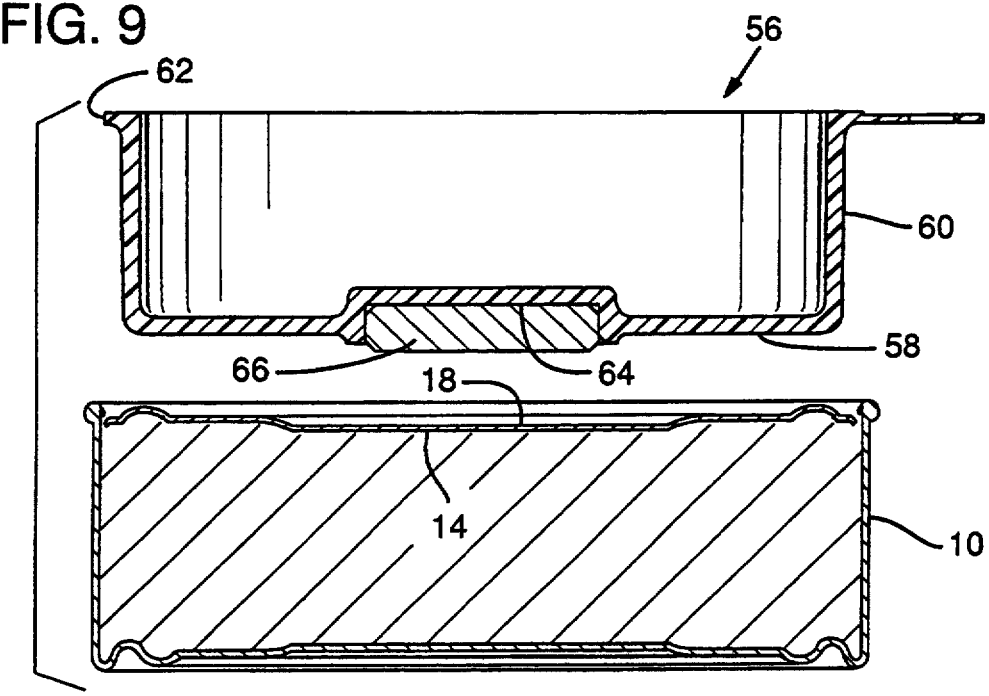
FIG. 9 is a sectional view of a further embodiment of the invention, this view showing the press in an initial step before pressing.
Figure 10:
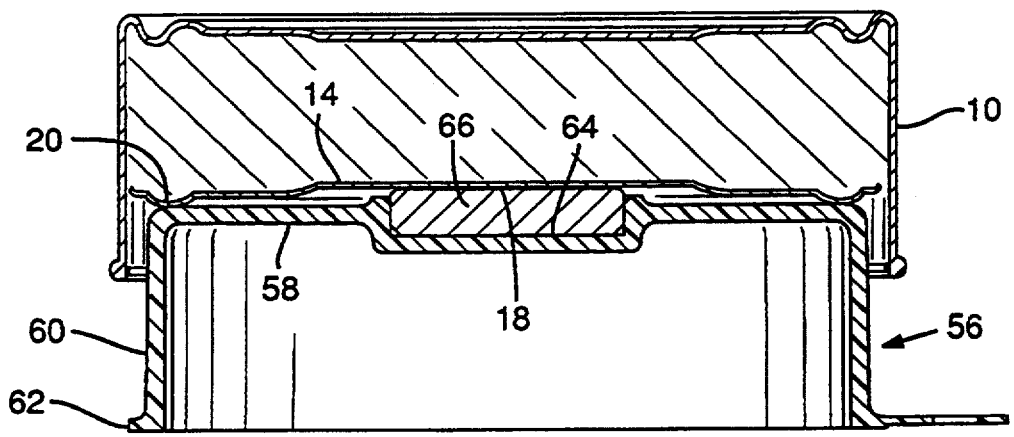
FIG. 10 is a sectional view of the press of FIG. 9 in an advancing step of pressing.
Figure 11:
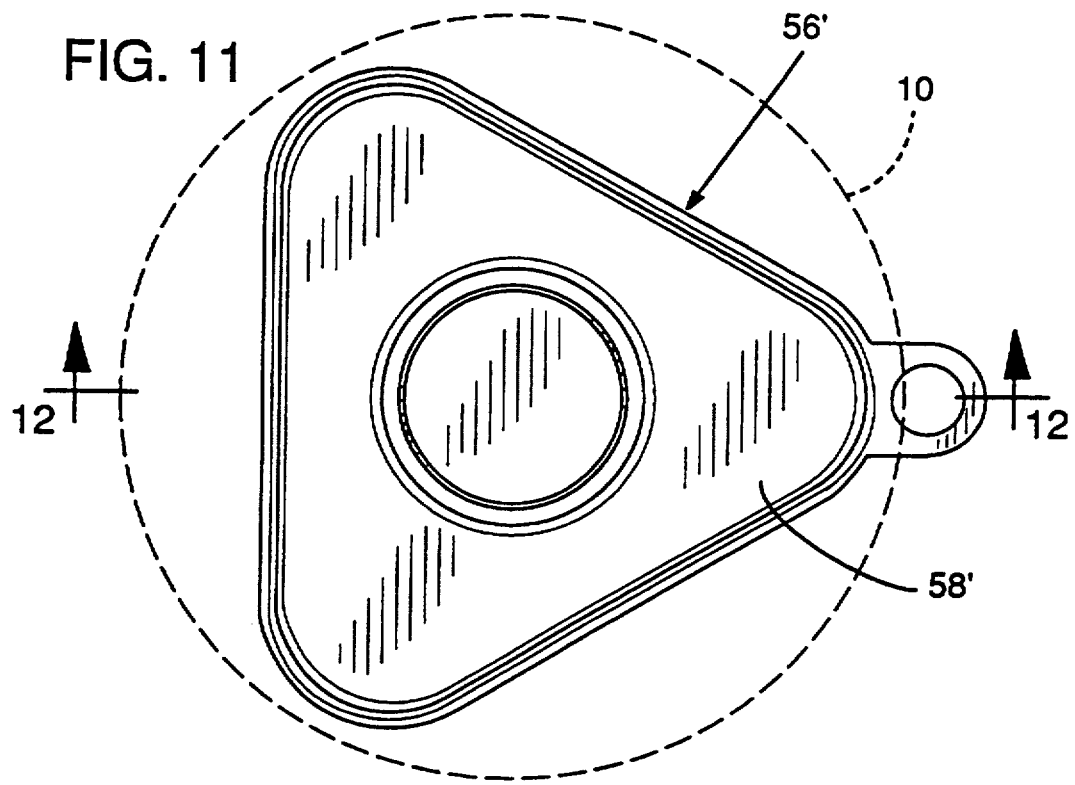
FIG. 11 is a plan view of yet another embodiment of the invention.
Figure 12:
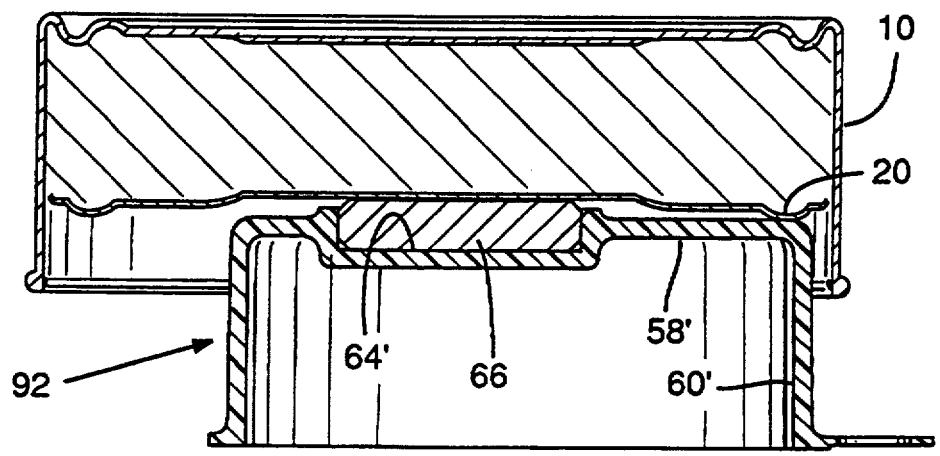
FIG. 12 is a sectional view taken on the line 12—12 of FIG. 11, this view showing this embodiment in an advancing pressing step.

In the embodiment of FIGS. 9 and 10, the press 56 comprises a cylindrical cup-like member having an imperforate top wall 58 and an imperforate side wall 60, the latter wall having a narrow lateral flange 62 at the open end. The top wall 58 has a socket 64 therein for retaining a magnet 66. In the operation of this embodiment, the press 56 is placed on the tuna can 10 in inverted position as shown in FIG. 9 and the assembly then turned over to the FIG. 10 position to accomplish the liquid extracting step by pushing down on the tuna can. The projecting magnet engages the top central recessed portion 18 of the lid, and the radially outwardly located portions of the wall 58 engage ribbed portion 20 of the lid for firm and substantially even pressing engagement of the lid in its pressing function. Again the lid is not deformed. This embodiment allows the side wall 60 to take any number of shapes as long as the top wall 58 engages the lid's ribbed portion 20 in a manner that pressure is applied evenly and the lid remains flat. This is illustrated for example in the embodiment of FIGS. 11 and 12 wherein a press 56' has the same features as the press of FIGS. 9 and 10 except that it is triangular in its overall shape rather than cylindrical. It likewise employs an imperforate top wall 58', an imperforate defining side wall 60', a magnet socket 64', and a magnet 66'. The top wall 58' and the magnet supply the pressing engagement against the lid similar to that of FIGS. 9, 10.

The present invention comprises an improved press for removing liquid from open tuna cans in that it has the improved function of using the lid as the pressing plate. It can be operated without the liquid contacting the user's hands as well as an almost impossible chance that the user will be injured from sharp edges of the severed lid. The magnet also retrieves the lid from inside the can and also can serve to hold the press on a refrigerator door or other metal surface when not in use.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. A press for forcing liquid from solid food in a can of the type having a lid arranged to be severed for opening the can, said press comprising:
   a body member having opposite parallel ends and a peripheral imperforate side wall, a first of said ends of said body member comprising an imperforate wall, the other end of said body member being open, one of said ends of said body member including lid engaging means that abut a severed but remaining lid of a can and utilize the lid as a pressing plate for maintaining the lid in a flat condition in pressing liquid from food in the can upon relative forced telescoping movement of said body member and the can, and a magnet on said lid engaging means that magnetically attracts the lid and pulls the lid out of the can upon reverse relative telescoping movement of said body member and the can, said lid engaging means and magnet forming a lid engaging surface that holds the lid in a flat plane at right angles to the axis of the can when the lid is pressed into the can.

2. The press of claim 1 wherein said imperforate side wall and said first end wall form a fluid holding reservoir capable of catching fluid pressed from the food in the can when the forced telescoping movement of said body member and the can is accomplished with the open end of said body member facing up and said can pressed down on said open end with the lid end facing down, said reservoir having a sufficient volume whereby the can remains out of contact therewith in a full press condition.

3. The press of claim 1 including a cylindrical flange leading from said imperforate end wall and disposed inwardly of said peripheral side wall in spaced, concentric relation therewith, said flange terminating in an end edge that forms a portion of said lid engaging means in a pressing operation.

4. A press for forcing liquid from solid food in cans of the type having a lid which has a central depression and a circular reinforcing rib outward thereof and which is arranged to be severed for opening the cans, said press comprising:

a body member having opposite ends and a peripheral cylindrical and imperforate side wall, a first of said ends of said body member comprising a first end wall, the other end of said body member being open, said open end of said body member including a lid engaging means engageable with the reinforcing rib of the lid and a magnet projecting from said body member for abutting the central depression of a severed but remaining lid of a can, said lid engaging means utilizing the lid as a pressing plate to press liquid from food in the can upon relative forced telescoping movement of said body member and the can.

5. The press of claim 4 including a cylindrical flange leading from said end wall and disposed inwardly of said peripheral side wall in spaced, concentric relation therewith, said flange terminating in an end edge that forms a portion of said lid engaging means in a pressing operation.

6. The press of claim 5 wherein said side wall has a diameter larger than the dimension of a can and is thus capable of moving exteriorly of the can surface in the relative forced telescoping movement of said body member and the can, and wherein said imperforate side wall and said first end wall form a fluid holding reservoir capable of catching fluid pressed from the food in the can when the forced telescoping movement of said body member and the can is accomplished with the open end of said body member facing up and said can pressed down on said open end with the lid end facing down, said reservoir having a sufficient volume whereby the can remains out of contact therewith in a full press condition.

* * * * *